United States Patent Office 3,704,288
Patented Nov. 28, 1972

3,704,288
**L-TYROSYL-1-AMINOCYCLOPENTANE-1-CAR-
BONYL-L-PHENYLALANINE**
Joseph A. Skorcz, 5359 N. Bay Ridge Ave.,
Milwaukee, Wis. 53217
No Drawing. Filed Apr. 16, 1970, Ser. No. 29,298
Int. Cl. C07c 103/52; C07g 7/00
U.S. Cl. 260—112.5                                    1 Claim

ABSTRACT OF THE DISCLOSURE

The compounds are novel peptides composed of an N-terminal-L-tyrosine moiety and a C-terminal-L-phenylalanine moiety joined by a 1-aminocyclopentane-1-carboxylic acid group or a 1-aminocyclohexane-1-carboxylic acid. The compounds are useful as hypotensive agents. Representative of the compounds disclosed are dicarbobenzoxy-L-tyrosyl-1-aminocyclopentane - 1 - carbonyl-L-phenylalanine methyl ester and L-tyrosyl-1-aminocyclopentane-1-carbonyl-L-phenylalanine.

DESCRIPTION OF THE INVENTION

The compounds of the present invention may be represented by the following formula:

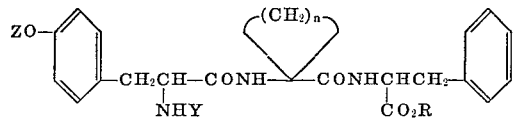

wherein Y and Z are hydrogen or a common peptide blocking group such as carbobenzoxy, t-butyloxycarbonyl, benzhydryloxycarbonyl and triphenylmethyl, $n$ is 4 or 5, R is hydrogen, an alkyl of 1 to 4 carbon atoms such as methyl, ethyl, propyl, isopropyl or butyl, or a phenyl-lower alkyl of 7 to 13 carbon atoms such as benzyl, phenethyl, phenylpropyl, phenylisopropyl or p-chlorobenzyl.

The compounds of the present invention may be prepared by first coupling carbobenzoxy-1-aminocyclopentane-1-carboxylic acid or carbobenzoxy-1-aminocyclohexane-1-carboxylic acid with L-phenylalanine methyl ester by conventional methods, then removing the nitrogen blocking group and treating the resulting ester with a blocked tyrosine such as dicarbobenzoxy-L-tyrosine under mixed anhydride coupling reaction conditions, such as, for example, in the presence of a haloformate, such as isobutyl chloroformate and triethylamine in a suitable reaction medium, such as dimethylformamide. The resulting protected peptide may then be subjected to alkali hydrolysis followed, if desired, by hydrogenation to remove the protective blocking groups.

The above described process may be illustrated as follows:

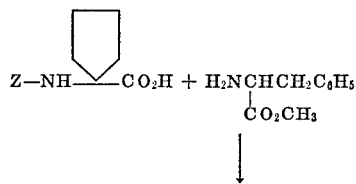

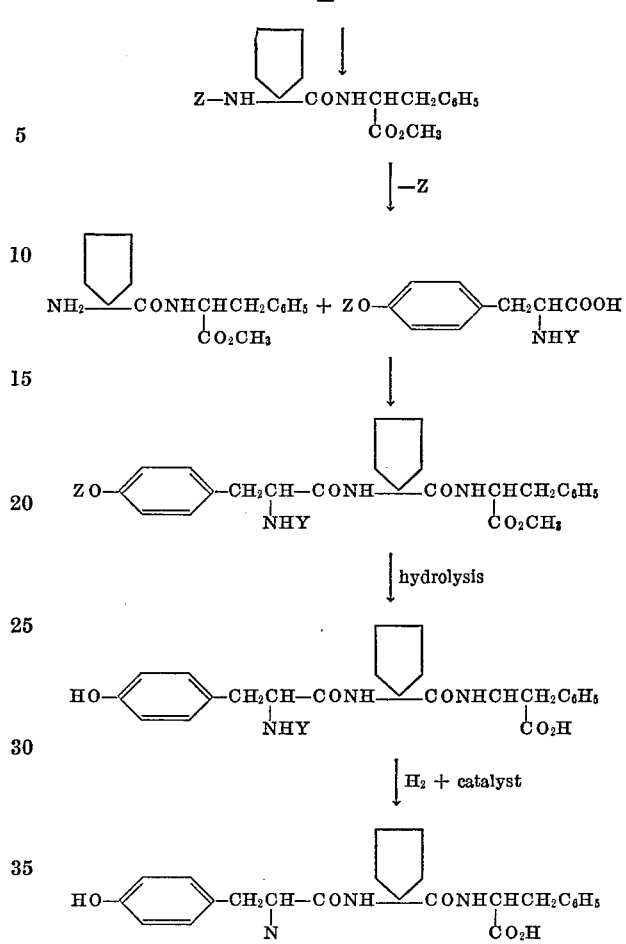

in which Y and Z are as previously described. In the above illustration the carbobenzyloxy group is employed as the blocking group; however, other groups such as t-butyloxycarbonyl and benzhydryloxycarbonyl groups also may be employed.

The peptide employed as the starting material may be conveniently prepared by treating 1-aminocyclopentane-1-carboxylic acid with carbobenzoxy chloride in an aqueous sodium hydroxide solution to attach the blocking group and then coupling the protected acid with L-phenylalanine methyl ester in a suitable reaction medium, such as dimethylformamide. The blocking group is then removed by hydrolysis or hydrogenation to obtain the desired ester.

Representative of the blocked and unblocked peptides which may be prepared in the described manner are carbobenzoxy - 1 - aminocyclopentane - 1 - carbonyl-L-phenylalanine methyl ester and 1-aminocyclopentane-1-carbonyl-L-phenylalanine methyl ester hydrobromide.

Representative of the final compounds of the present invention which may be prepared in the described manner from the peptide starting materials are the following:

dicarbobenzoxy-L-tyrosyl-1-aminocyclopentane-1-
carbonyl-L-phenylalanine methyl ester, di-t-butyloxycarbonyl-L-tyrosyl-1-aminocyclopentane-1-carbonyl-L-phenylalanine methyl ester,
dibenzhydryloxycarbonyl-L-tyrosyl-1-aminocyclopentane-1-carbonyl-L-phenylalanine methyl ester,
di-triphenylmethyl-L-tyrosyl-1-aminocyclopentane-1-carbonyl-L-phenylalanine methyl ester,
N-carbobenzoxy-L-tyrosyl-1-aminocyclopentane-1-carbonyl-L-phenylalanine methyl ester,
N-t-butyloxycarbonyl-L-tyrosyl-1-aminocyclopentane-1-carbonyl-L-phenylalanine methyl ester,
N-benzhydryloxycarbonyl-L-tyrosyl-1-aminocyclopentane-1-carbonyl-L-phenylalanine methyl ester,
N-triphenylmethyl-L-tyrosyl-1-aminocyclopentane-1-carbonyl-L-phenylalanine methyl ester,
L-tyrosyl-1-aminocyclopentane-1-carbonyl-L-phenylalanine,
L-tyrosyl-1-aminocyclopentane-1-carbonyl-L-phenylalanine monomethylate monohydrate,
dicarbobenzoxy-L-tyrosyl-1-aminocyclohexane-1-carbonyl-L-phenylalanine methyl ester,
N-carbobenzoxy-L-tyrosyl-1-aminocyclohexane-1-carbonyl-L-phenylalanine, and
L-tyrosyl-1-aminocyclohexane-1-carbonyl-L-phenylalanine.

The novel compounds of the present invention may, if preferred, be employed in pharmaceutical agents in the form of their lower alkyl esters. The active ingredient is preferably combined with pharmaceutical diluents and additives and formed into unit dosage forms suitable for oral and parenteral administration such as tablets, capsules and parenteral solutions.

The compounds of the present invention are mild central nervous system stimulants. For example, the compound L - tyrosyl - 1 - aminocyclopentane-1-carbonyl-L-phenylalanine monoacetate monohydrate when administered in doses of 3 to 300 mg./kg. intraperitoneally to mice produces a behavioral profile characterized by vocalization, restlessness, enhanced irritability, which is indicative of central nervous system stimulation. As a result of the behavioral tests the compound was found to have an $LD_{50}$ in excess of 2,000 mg./kg. intraperitoneally. The behavioral studies were conducted in accordance with the procedure set forth by Irwin in "Animal and Clinical Pharmacologic Techniques in Drug Evaluation," J. H. Nodine and P. E. Siegler, Ed. Year Book Publishers, Inc., 1964, pp. 36–54. The behavioral profile produced by administration of the compound was quite similar to that produced by the administration of known antihypertensive agents.

In the standard anesthetized cat test, which is used to evaluate antihypertensive agents, the compound L-tyrosyl - 1 - aminocyclopentane - 1 - carbonyl-L-phenylalanine monoacetate monohydrate in doses of 1 to 10 mg./kg. intravenously produced a blood pressure response which was from 7 to 11 mm. below pre-drug levels. In further tests in the standard anesthetized dog preparation which is also used to evaluate antihypertensive agents the compound was found at doses of 1, 3 and 10 mg./kg. intravenously to produce a blood pressure decline of 22% to 67%.

The compounds of the present invention may be administered orally or parenterally to hypertensive animals to effect to lower blood pressure. When employed intravenously the preferred dose range is from about 0.1 to about 20 mg./kg. daily of the active ingredient. Oral doses may range from about 10 to 500 mg./kg. daily. Higher or lower doses may also be prescribed depending upon the present level of the blood pressure in the animal and the level to which it is desired to reduce the blood pressure.

The following examples are presented to illustrate the practice of the invention:

EXAMPLE 1

Carbobenzoxy-1-aminocyclopentane-1-carbonyl-L-phenylalanine methyl ester

The carbobenzoxy-1-aminocyclopentane-1-carbonyl-L-phenylalanine methyl ester is prepared by treating carbobenzoxy-1-aminocyclopentane-1-carboxylic acid (17.1 g., 0.065 mole) and L-phenylalanine methyl ester hydrochloride (14 g., 0.065 mole) with 8.9 g. (0.065 mole) of isobutyl chloroformate and 0.13 mole of triethylamine in 140 ml. of dimethylformamide, as previously described. The carbobenzoxy - 1 - aminocyclopentane-1-carbonyl-L-phenylalanine methyl ester after recrystallization from chloroform-petroleum ether melts at 141–143°.

*Analysis.*—Calcd. for $C_{24}H_{28}N_2O_5$ (percent): C, 67.74; H, 6.65; N, 6.60. Found (percent): C, 68.08; H, 6.85; N, 6.66.

EXAMPLE 2

1-aminocyclopentane-1-carbonyl-L-phenylalanine methyl ester hydrobromide

A solution of 8.5 g. (0.02 mole) of the carbobenzoxy compound of Example 1 in 70 ml. of acetic acid saturated with dry hydrogen bromide is stirred under nitrogen for 1.5 hours; the solution is then diluted with ether and refrigerated. The deposited solid is filtered and recrystallized from ethanol-ether to yield 1-aminocyclopenane-1-carbonyl-L-phenylalanine methyl ester hydrobromide in the form of a white powder, M.P. 181–183°.

*Analysis.*—Calcd. for $C_{16}H_{22}N_2O_3 \cdot HBr$ (percent): C, 51.76; H, 6.24; Br, 21.52; N, 7.54. Found (percent): C, 51.98; H, 5.96; Br, 21.56; N, 7.54.

EXAMPLE 3

Dicarbobenzoxy-L-tyrosyl-1-aminocyclopentane-1-carbonyl-L-phenylalanine methyl ester The coupling of the hydrobromide of Example 2 (32.9 g., 0.089 mole) and dicarbobenzoxy-L-tyrosine (39.9 g., 0.089 mole) is carried out in the presence of 0.04 mole of isobutyl chloroformate and 0.08 mole of triethylamine in dimethylformamide. Fractional recrystallization of the crude product from chloroform-petroleum ether and then from aqueous ethanol yields dicarbobenzoxy-L-tryosyl-1-aminocyclopentane - 1 - carbonyl-L-phenylalanine methyl ester in the form of a white powder, M.P. 165–168°.

*Analysis.*—Calcd. for $C_{41}H_{43}N_3O_4$ (percent): C, 68.12; H, 6.01; N, 5.81. Found (percent): C, 67.79; H, 6.05; N, 5.92.

EXAMPLE 4

N-carbobenzoxy-L-tyrosyl-1-aminocyclopentane-1-carbonyl-L-phenylalanine monohydrate The ester of Example 3 (2.8 g., 0.004 mole) is hydrolyzed with 0.012 mole of 2 N sodium hydroxide in 60 ml. of dioxane-methanol (1:1) over a 3-hour period. Crystallization of the initially isolated gum from methanol-water (2:1) affords N - carbobenzoxy-L-tyrosyl-1-aminocyclopentane-1-carbonyl-L-phenylalanine monohydrate as a white powder, M.P. 114–118°.

*Analysis.*—Calcd. for $C_{32}H_{35}N_3O_6 \cdot H_2O$ (percent): C, 64.96; H, 6.30; N, 7.10. Found (percent): C, 64.91; H, 5.96; N, 7.15.

EXAMPLE 5

L-tyrosyl-1-aminocyclopentane-1-carbonyl-L-phenylalanine acetate monohydrate

Decarbobenzoxylation of 2.65 g. (0.0045 mole) of the compound of Example 4 in methanol (75 ml.)-acetic acid (50 ml.) with hydrogen, in the presence of a palladium catalyst, provides a gummy material which solidifies during trituration with dry ether. The resulting L-tyrosyl-1-aminocyclopentane - 1 - carbonyl-L-phenylalanine acetate monohydrate in the form of a white powder melts at 205–208°. Recrystallization from aqueous methanol raises the M.P. to 214–216.5°.

*Analysis.*—Calcd. for $C_{24}H_{29}N_3O_5 \cdot C_2H_4O_2 \cdot H_2O$: C, 60.33; H, 6.82; N, 8.12. Found (percent): C, 60.33; H, 6.45; N, 7.81.

I claim:
1. L - tyrosyl-1-aminocyclopentane - 1 - carbonyl-L-phenylalanine acetate monohydrate.

References Cited

FOREIGN PATENTS 6609246   1/1967   Netherlands _____ 260—112.5

OTHER REFERENCES

Rudinger, Peptides, Young, ed., Macmillan Comp., New York (1963), pp. 137–138.

Tailleur et al., Can. J. Chem., 39, 1309–1320 (1961).

Schroder et al., The Peptides, vol. I, Academic Press, New York (1965), pp. 52–57.

Mazur et al., J. Org. Chem., 28, 1028–1029 (1963).

Shankman et al., J. Med. Pharm. Chem., 5, 42–49 (1962)

ELBERT L. ROBERTS, Primary Examiner

U.S. Cl. X.R.

424—177